United States Patent [19]
Christianson et al.

[11] 3,958,173
[45] May 18, 1976

[54] POWER CONVERTER EMPLOYING NON-SATURATING INTERPHASE TRANSFORMER

[75] Inventors: Clinton C. Christianson, Minnetonka, Minn.; Robert F. Bourke, Wilson, Wis.

[73] Assignee: Gould Inc., Rolling Meadows, Ill.

[22] Filed: Feb. 11, 1975

[21] Appl. No.: 548,912

[52] U.S. Cl. .............................. 321/45 C; 321/26; 321/47
[51] Int. Cl.² ........................................ H02M 7/515
[58] Field of Search ................. 321/43, 45 R, 45 C, 321/46, 47, 26; 307/252 M

[56] References Cited
UNITED STATES PATENTS

| | | | |
|---|---|---|---|
| 3,331,011 | 7/1967 | Landis | 321/45 C |
| 3,487,278 | 12/1969 | Turnbull et al. | 321/45 C |
| 3,524,990 | 8/1970 | Bajpai et al. | 321/45 R |
| 3,648,149 | 3/1972 | Brown et al. | 321/26 |
| 3,872,372 | 3/1975 | Kautz et al. | 321/45 C |

OTHER PUBLICATIONS
Principles of Inverter CKTS by Bedford and Hoft, TK 2796B37, Dec. 23, 1964; pp. 231–278.

*Primary Examiner*—Gerald Goldberg
*Attorney, Agent, or Firm*—Wolfe, Hubbard, Leydig, Voit & Osann, Ltd.

[57] ABSTRACT

A power converter for operation with a d.c. power supply to provide an output voltage having a level controlled in response to an external control signal. The converter uses a dual chopper configuraton with the out of phase outputs from the respective chopper halves being combined in an interphase transformer. To prevent the interphase transformer from saturating, the chopper control includes an oscillator, counter, D/A converter and phase delay comparator arrangement for maintaining substantially identical duty cycles in the respective legs while, of course, allowing the duty cycles to be varied in unison. The interphase transformer is wound in a configuration which presents a magnetic shunt between the halves of the transformer, said shunt serving to limit transients which might be coupled to the chopper load.

15 Claims, 5 Drawing Figures

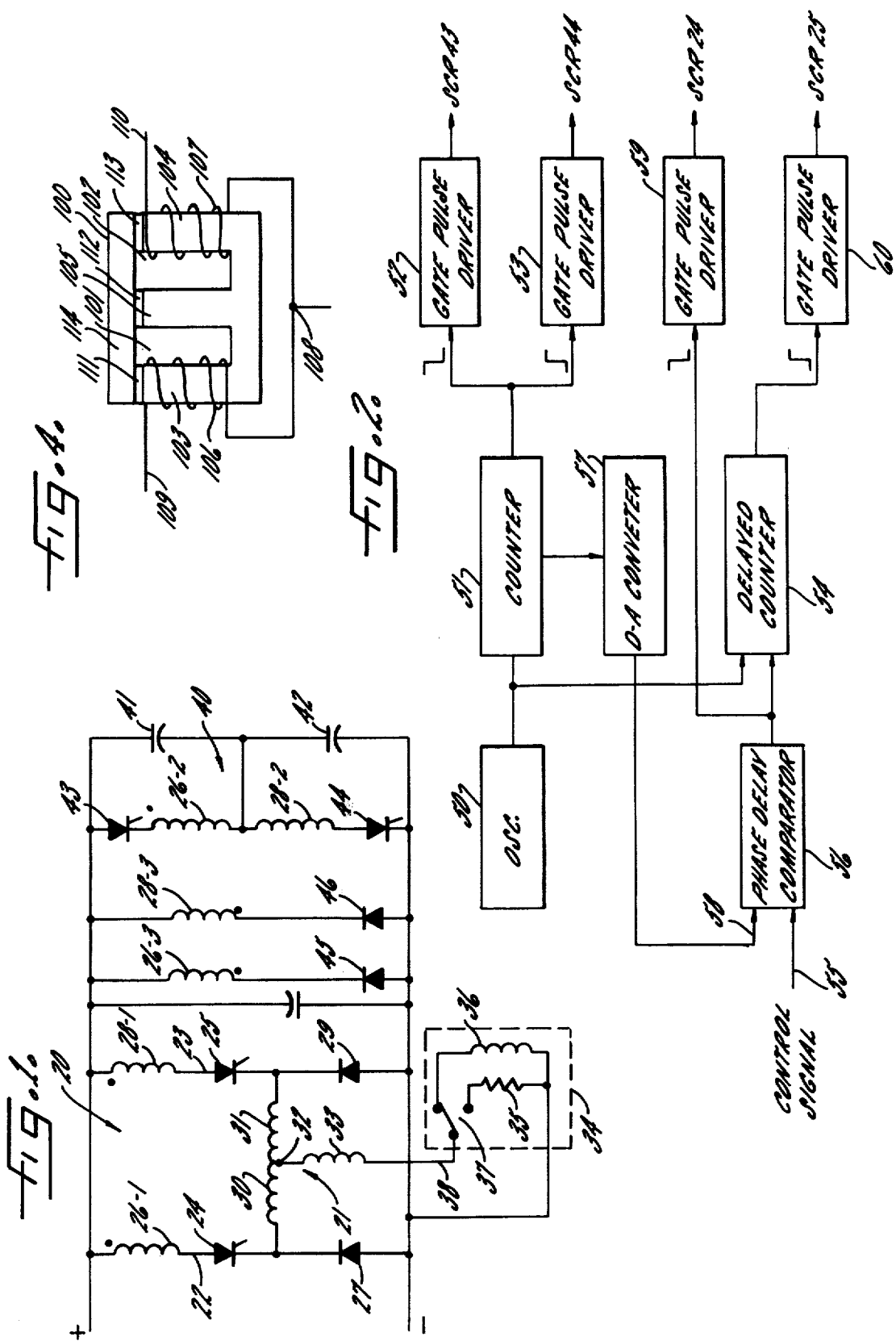

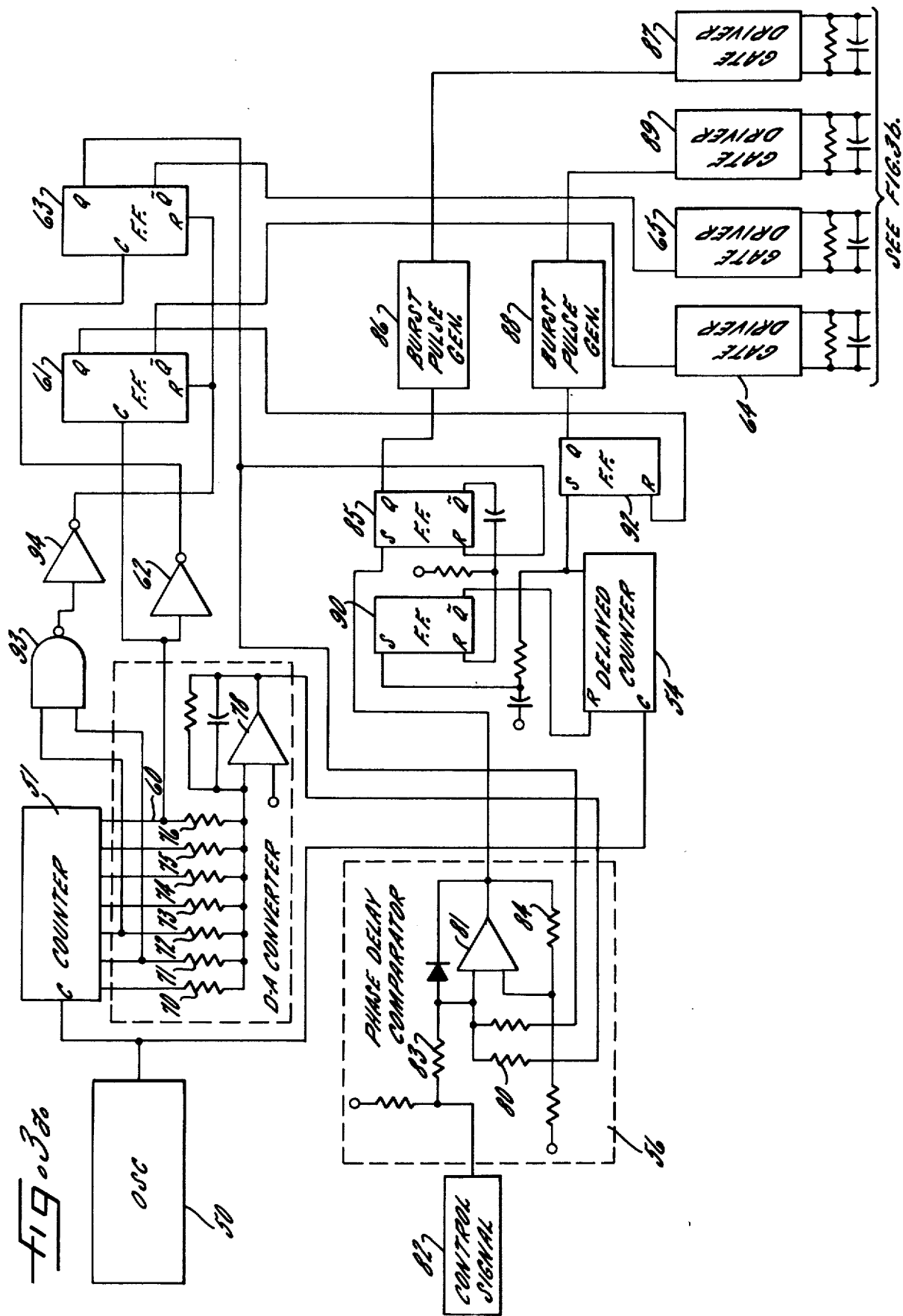

POWER CONVERTER EMPLOYING NON-SATURATING INTERPHASE TRANSFORMER

This invention relates to power converters and more particularly to those of dual chopper configuration.

Chopper circuits are well adapted to operate with a d.c. power supply to produce a d.c. output of controlled level, such control typically being achieved by operating the chopper at a variable duty cycle. Dual choppers have been devised for reasons, among others, of increasing the current carrying capability of the chopper using available thyristors and for improving the ripple factor. The dual chopper configuration contemplates the firing of the individual legs of the chopper out of phase with respect to each other, requiring that the outputs of the individual legs be combined via respective inductors in order to provide an average output signal. Accordingly, employment of the dual chopper configuration generally requires the provision of two inductors, increasing the size and cost of the overall circuit.

In view of the foregoing, it is a general object of the invention to provide a dual chopper circuit having only a single magnetic element for combining the outputs of the respective legs of the chopper. In this regard, it is a more detailed object to provide such a chopper wherein the magnetic element includes a pair of windings arranged so that their mutual flux enhances the operation of the magnetic element.

A general objective of the present invention is to utilize an interphase transformer for combining the outputs of the respective legs of a dual chopper. In this regard, it is a more specific object to operate the chopper in a manner which will prevent the interphase transformer from saturating. An even more detailed object is to match the duty cycles of the respective legs of the chopper thereby to precisely match the average d.c. voltage at the respective legs of the chopper.

According to one aspect of the invention, it is a detailed object to use digital techniques for controlling the duty cycle of a dual chopper to precisely match the duty cycle of the respective legs thereof.

A detailed object, according to a still further aspect of the invention, is to combine the outputs of the respective legs of a dual chopper by means of an interphase transformer, such transformer being provided with a magnetic shunt which simulates a series inductance in the chopper output over at least a portion of the current range of the chopper.

Other objects and advantages will become apparent from the following detailed description, taken in conjunction with the drawings, in which:

FIG. 1 is a schematic diagram illustrating a chopper circuit exemplifying the present invention;

FIG. 2 is a block diagram showing the gating control for the chopper of FIG. 1;

Figure 3B:
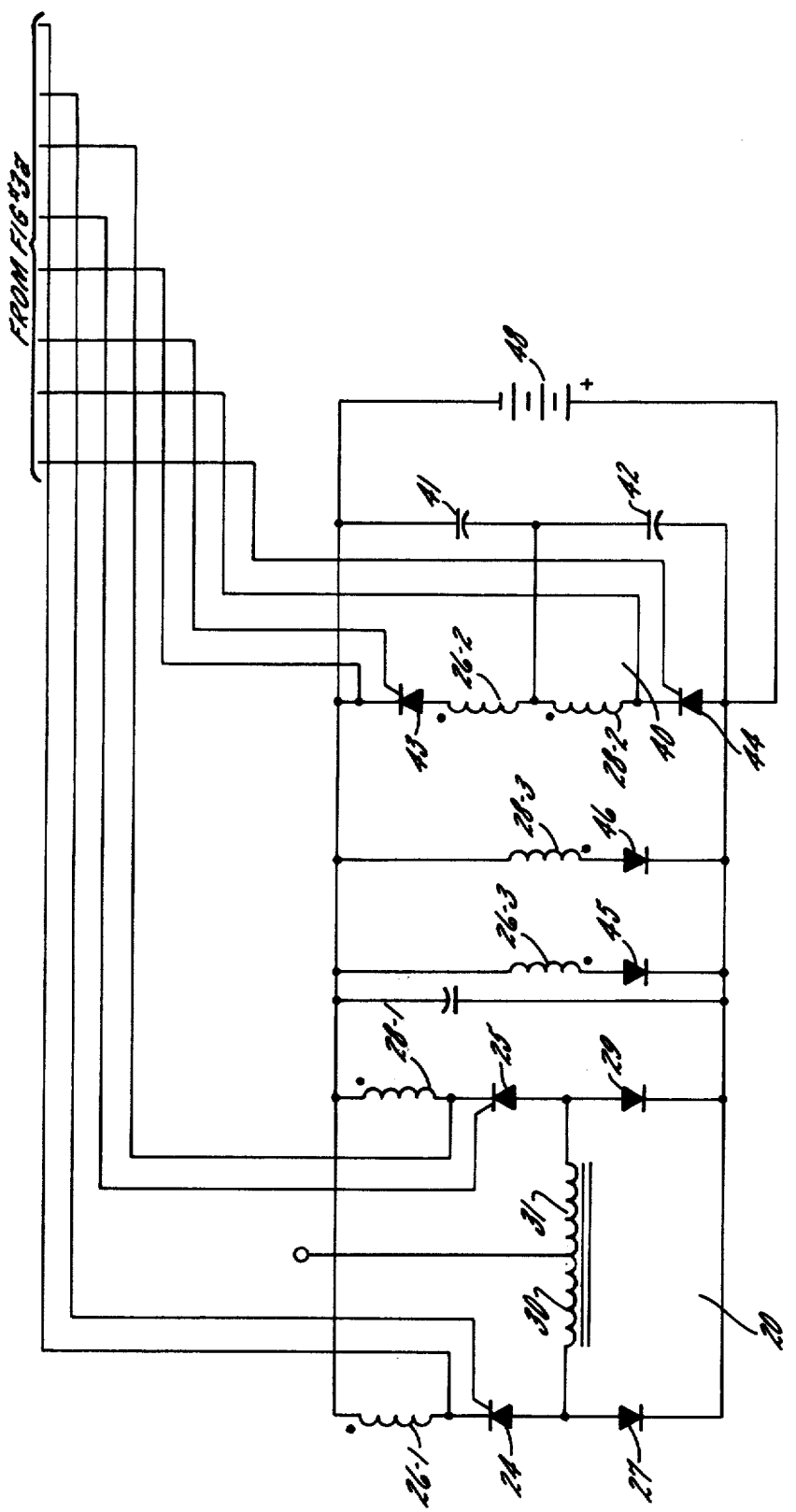

FIGS. 3a and 3b when joined form a schematic diagram of a chopper and gating control exemplifying the present invention; and FIG. 4 is a diagram illustrating an interphase transformer.

While the invention will be described in connection with a preferred embodiment, it will be understood that there is no intent to limit it to that embodiment. On the contrary, the intent is to cover all alternatives, modifications and equivalents included within the spirit and scope of the invention as defined by the appended claims.

Turning now to the drawings, and particularly to FIG. 1, there is shown a dual chopper circuit generally indicated at 20 having an interphase transformer 21 for combining the output of the respective legs 22, 23. For controlling conduction in the respective legs, a pair of gate controlled thyristors, shown herein as SCRs 24, 25 are provided. Commutation components for terminating conduction in the associated legs include inductor 26-1 and diode 27 in the leg 22, and inductor 28-1 and diode 29 in the leg 23.

For combining the outputs of the chopper legs 22, 23, the interphase transformer 21 includes a pair of windings 30, 31 coupled between the respective legs and a common junction 32. Such interphase transformer is adapted to absorb the instantaneous differences in direct voltage between the legs 22, 23 to provide an average output signal. However, as will be emphasized below, using such interphase transformer the average d.c. outputs of the legs 22 and 23 must be maintained at substantially identical levels in order to prevent an average d.c. current flow through windings 30 and 31, such current flow tending to saturate the interphase transformer.

Realizing that switching within the chopper 20 occurs at a very rapid rate, it will be apparent that such circuit generates high frequency transients; it is generally necessary to prevent these transients from being coupled to certain types of the loads such as capacitive loads or battery loads. To that end, an inductor 33 is coupled between the junction 32 and the load, schematically illustrated at 34. As will be described in more detail below, the inductor 33 is not an actual coil, but is an inductive effect achieved by a magnetic shunt within the interphase transformer 21. As a result, it is seen that the interphase transformer accomplishes the function of three separate magnetic elements, thus decreasing the cost, size and weight of the overall system. For purposes of illustrating the effect of the magnetic shunt, the load 34 is shown comprising a resistive load 35, and inductive load 36 of lower d.c. impedance than the load 35, and a switch 37 for selectively coupling the output 38 of the chopper to the respective loads.

For inducing a voltage in the coils 26-1 and 28-1 for commutating the SCRs 24, 25, means are provided for producing a current pulse in an element magnetically coupled with said coils, such means being shown herein as commutating inverter 40. The primaries for the coils 26-1 and 28-1, namely coils 26-2 and 28-2, are adapted to resonate with capacitors 41, 42 under the control of gate controlled thyristors 43, 44. Assuming, for example, that it is desired to commutate SCR 24 in the chopper circuit, SCR 43 is gated, causing capacitors 41, 42 to rapidly discharge through SCR 43 and inductor 26-2. The turns ratio between inductors 26-1 and 26-2 is selected and the windings are so phased that the voltage induced in inductor 26-1 exceeds the d.c. potential of the power supply, reverse biasing SCR 24, causing it to commutate. Similarly, a current pulse through inductor 28-2 caused by the triggering of commutating SCR 44 serves to produce a voltage across inductor 28-1 sufficient to commutate SCR 25. For preventing the buildup of excessive voltages on the capacitors 41, 42 respective clamp means are provided including coils 26-3 and 28-3 and their associated clamping diodes 45, 46. The turns ratio between primaries 26-2 and 28-2 and their respective secondaries 26-3 and 28-3 are selected, and the windings are phased so that the voltage across the clamping coils exceeds the battery voltage and forward biases the clamping diode at a predetermined point after sufficient energy is stored in the commutating circuit for performing the next commutation.

When using an interphase transformer as an output element for a dual chopper as described above, it is important to maintain the outputs of the respective legs of the chopper at substantially the same level. If, for example, the average d.c. level at the output of leg 22 were higher than that of leg 23, there would exist a d.c. current component flowing from leg 22 through coil 30 and coil 31 to leg 25. Such d.c. current would tend to saturate the interphase transformer, preventing it from properly performing its function.

Since the output level of each leg of the chopper is dependent upon the duty cycle at which the thyristor therein is operated, means are provided for matching the duty cycles of the respective legs. A block diagram of an exemplary gating circuit capable of operating under the aforementioned restraints is illustrated in FIG. 2. As will become apparent, the circuit of FIG. 2 operates at a constant commutating frequency and varies the duty cycle by adjusting the phase of the chopper firing with respect to the fixed frequency of the commutating inverter. It should be noted, however, that other forms of duty cycle gating controls, including variable frequency controls and controls based upon analog principles, may be utilized without departing from the invention.

For providing a time base for the gating circuitry, an oscillator 50, operable at a relatively high frequency such as 500 kHz, has its pulse output coupled to the clock input of a counter 51 and a similar delayed counter 54. The counters 51 and 54 are identical in structure, the difference in function being attributable to the manner in which they are applied in the circuit. The counter 51 includes a number of binary stages for dividing the frequency of the oscillator 50 to produce the basic operating frequency of the chopper. For example, if 10 binary stages are provided, the counter output, taken at its most significant bit will be a square wave of approximately 500 Hz. Since the counter 51 is allowed to continuously cycle, the output thereof will be a pure square wave with a transition corresponding to each complete cycle of the counter. A pair of gate pulse drivers 52, 53 are coupled to the output of counter 51 and are driven thereby to gate SCRs 43, 44 respectively. As illustrated on the drawing, gate pulse driver 52 responds to the trailing edge of the counter signal while gate pulse driver 53 responds to the rising edge thereof. Thus, it is seen that the counter acts through the gate pulse drivers 52, 53 to alternately gate the SCRs 43, 44 to establish the basic operating frequency of the chopper.

As noted above, the duty cycle of the chopper is established and varied by controlling the time in advance of the firing of the commutating SCR at which the associated chopper SCR is fired. For example, if a relatively low duty cycle were required, SCR 24 would be fired just prior to the firing of SCR 43, and SCR 25 would be fired on an identical period before the firing of SCR 44. It it were desired to advance the duty cycle, the SCRs 24 and 25 would be fired further in advance of their associated commutating SCRs.

In the illustrated embodiment, an external control signal provided on input 55 is used to control the duty cycle of the chopper. Such signal is provided as a first input to a phase delay comparator 56. The second input to the comparator 56 is provided by a digital to analog converter 57. The D/A converter 57 has the binary outputs of the counter 51 coupled thereto, and thus produces a recycling ramp signal in the form of a sawtooth wave in response to the continual recycling of the counter 51. The phase delay comparator 56 compares the ramp signal on input 58 and the control signal on input 55, producing an output signal when such signals reach a predetermined correspondence. This output signal is coupled to the delayed counter 54 and serves to take such counter out of its reset state. The output signal is also coupled to a gate pulse driver 59 which serves to fire SCR 24. It will now be appreciated that the number of counts required to fill the counter 51 from the point at which the phase delay comparator is actuated is a measure of the time between the firing of SCR 24 and its associated commutating SCR 43. Because the delayed counter 54 is held in the reset condition until SCR 24 is triggered, the count within the delayed counter 54 will be less than that within counter 51 by a number equal to the count within counter 51 at the time SCR 24 was fired. Thus, when the counter 51 fills to fire SCR 43, the delayed counter 54 will still require a number of clock pulses equal to the count within counter 51 at the time SCR 24 was fired before it is able to fill and produce, at the output of its most significant bit, a signal for energizing a gate pulse driver 60. In other words, the difference between the count contained in counter 51 and that contained in delayed counter 54 is a measure of "on" period of leg 22. The delayed counter serves to digitally match the "on" period of leg 23 to this value. As a result, the period of advance for the firing of the SCRs 24 and 25 is maintained identical by operating the counters 51 and 54 out of phase by an amount related to the advance. It should also be noted that the degree of advance of the firing of the SCR 24 is determined by the level of the control signal provided to input 55; the counting circuitry serving to match the advance of the firing of SCR 25 to that of SCR 24.

Turning now to the more detailed circuit drawings of FIGS. 3a and 3b, there is shown the interconnection between the gating control and power circuit for operating the chopper with the respective halves thereof out of phase but at the same duty cycle. It is seen that certain of the elements of FIGS. 3a and 3b are illustrated in diagrammatic form, it being contemplated that such elements are conventional and thus may be implemented in various forms by one skilled in the art. Referring first to FIG. 3b, there is shown the power portion of the circuit including the chopper 20 and the commutating inverter 40. It is seen that while the position of certain of the elements differs from that shown in FIG. 1 (for the purpose of using the positive bus as a reference), the overall configuration operates in the same manner as that described previously.

Turning to FIG. 3a, there is shown the master time base oscillator 50 having its clock output coupled to the counter 51 and to the delayed counter 54. The most significant bit output 60 of the counter 51 is coupled directly to the clock input of a flip-flop 61, and via an inverter 62 to the clock input of a flip-flop 63. Thus, the flip-flop 63 is triggered at the trailing edge of the signal on output 60 while the flip-flop 61 is triggered at the rising edge thereof. The flip-flops 61, 63 have their $\overline{Q}$ outputs coupled to gate drivers 64, 65 respectively. Gate driver 64, in turn, provides a gating signal to commutating SCR 43 while gate driver 65 similarly gates SCR 44. It will be appreciated that the described structure gates the commutating inverter SCRs at a fixed frequency and 180° out of phase as described with reference to FIG. 1.

The counter 51 has the outputs of the binary stages therein coupled via respective resistors 70 through 76 to a summing junction formed at the inverting input of an amplifier 78. The resistors 70 through 76 are weighted in a binary manner, and the amplifier 78 is biased so that its output produces a ramp signal corresponding to the increasing count in the counter 51, and recycling for each cycle of the counter. The ramp signal thus produced is coupled to the phase delay comparator through a resistor 80 to a summing junction at the inverting input of an amplifier 81. A control signal producing means 82 provides a second input to the summing junction through a resistor 83. The amplifier 81 is biased so that its output is maintained at a low level until the control signal produced by controller 82 and the ramp signal coupled via resistor 80 lower the voltage at the inverting input of the amplifier 81 by an amount sufficient to drive the amplifier output high. It is seen that a resistor 84 provides regenerative feedback maintaining the output of the amplifier 81 in the high condition. This high signal is coupled to the set input of a flip-flop 85 which, in response thereto, causes its Q output to go high, actuating a burst pulse generator 86. The burst pulse generator 86 is conventional in form, being adapted to generate a series of spaced gating pulses for assuring that the SCR 24 in the high current chopper circuit is positively gated. To that end, the pulses produced by the burst pulse generator 86 are coupled through a gating driver 87 to the gate of SCR 24. It is noted that SCR 25 is provided with a similar gating circuit including a burst pulse generator 88 and a gate driver 89.

In concurrence with the gating of SCR 24 in response to the setting of flip-flop 85, the $\overline{Q}$ output of the flip-flop couples a pulse to the reset input of a flip-flop 90. The flip-flop 90 has its $\overline{Q}$ output coupled to the reset input of the delayed counter 54. Accordingly, the flip-flop 90 in response to the triggering of flip-flop 85 releases the reset which had been maintained on the delayed counter 54. Thus, the delayed counter is allowed to begin counting in synchronism with the counter 51 but delayed therefrom by a number of counts related to the duty cycle of leg 22. When the counter 51 completes its next cycle, the output 60 will act through inverter 62 to clock flip-flop 63. The $\overline{Q}$ output of the flip-flop will act through gate driver 65 to trigger SCR 43 thereby commutating SCR 24. The delayed counter 54, retarded in count by an amount related to the phase advance of SCR 24, continues to count upward until it completes its cycle at which time it produces an output signal and couples such signal to the set input of a flip-flop 92. In a manner similar to the cooperative action between flip-flop 85 and burst pulse generator 86, the flip-flop 92 activates the burst pulse generator 88, which produces a series of pulses coupled through gate driver 89 to the gate of SCR 25. Thus, SCR 25 is driven into conduction at the appropriate time to maintain the duty cycle of the second leg of the chopper equal to that of the first leg.

It is seen that the illustrated gating circuitry also includes various resetting functions for preparing the circuitry for subsequent cycles. For example, the delayed counter 54 is locked back into its reset state at the termination of its cycle by way of the connection between the output thereof and the set input of flip-flop 90. It is recalled that flip-flop 90 has its $\overline{Q}$ output coupled to the reset input of the delayed counter 54, thus holding the counter in reset whenever the flip-flop is set. For resetting the flip-flops which control the various gate drivers, a NAND gate 93 has its input coupled to two of the lower bit outputs of the counter 51 so that the out-put of the NAND gate 93 is driven low rather early in the cycle of the counter 51. The output of NAND gate 93 is inverted by an inverter 94 and coupled to the reset inputs of the flip-flops 61 and 63, driving their Q outputs low. The Q output of flip-flop 63 is coupled to the reset input of flip-flop 85 to reset such flip-flop deenergizing the burst pulse generator 86. Similarly, the Q output of flip-flop 61 is coupled to the reset input of flip-flop 92 for causing the flip-flop to remove the input signal from the burst pulse generator 88.

FIG. 3b illustrates use of a battery 48 as the power source for the chopper described in detail above. Such an arrangement is worthy of note in that we have found that the dual chopper configuration increases efficiency when operating as a battery load because it minimizes the losses attributable to the internal resistance of the battery. More specifically, the power output of a chopper is modulated by varying its duty cycle or, in other words, its ratio of output to input voltage. If a single ended chopper and a dual chopper are driven from identical input voltages, for any demanded output voltage the ratio of RMS to average current in the single ended chopper will always be higher than that for the dual chopper. Realizing that the internal resistance of the battery is not negligible, and that the average current is a measure of the power delivered to the load, while the RMS current determines battery losses, the desirability of minimizing the RMS to average current ratio is appreciated. In a chopper circuit, the RMS and average currents are equal at 100% duty cycle and therefore their ratio is unity. However, at other duty cycles, since the pulse height remains relatively constant while the pulse width decreases, the ratio of RMS to average current increases with decreasing duty cycle. But for any duty cycle except 100%, the RMS to average current ratio for a dual chopper is always less than that of a single ended chopper. Since the battery losses are dependent upon the square of the RMS current, it is seen that minimizing the ratio serves to deliver maximum power with minimum battery losses.

The structure of the interphase transformer discussed above is diagrammatically illustrated in FIG. 4, which shows a transformer core 100 having a pair of windows 101, 102 forming a pair of out legs 103, 104 and a central leg 105. The core is formed so that the width of the legs 103, 104 and 105 are all equal. Additionally, gaps 111, 112 and 113 are formed between the legs 103, 104, 105 and the bridging member 100. The windings 106, 107 are placed on the outer legs 103, 104, the windings having a common junction 108 forming the output of the interphase transformer. The interphase transformer inputs are formed at the free ends of the windings 109, 110.

Current flow is into the respective inputs 109, 110 and out the output 108. In response to the current flow, flux in the core links the windings 106, 107 tending to average the ripple in the chopper output signal. The leg 105 forms a magnetic shunt for the flux paths, such shunt appearing to current flow in the windings as an inductance serially coupled in the output 108. The inductive effect achieved by this magnetic shunt serves to isolate the load from the high frequency transients in the chopper. Thus, the magnetic shunt provided by leg 105 effectively eliminates the need for a separate filtering choke. If desired, the shunt can be allowed to saturate under certain conditions, such as those where current smoothing is not required. Since the current at which the shunt saturates is determined by the size of the gaps 111, 112 and 113 in conjunction with the other magnetic dimensions of the transformer, the interphase transformers can be dimensioned to achieve shunt saturation at any desired current level. Not only is this advantageous in reducing the size of the transformer in cases where the saturation can be tolerated, but in certain applications, such as fast responding servo systems, the elimination of the series inductance at a known current level is a valuable feature.

A further desirable application for a dual chopper interphase transformer arrangement is disclosed in our application Ser. No. 548,911 entitled Electrically Propelled Vehicle filed concurrently herewith and assigned to the same assignee as the present invention. In the vehicle described therein, a dual chopper is used in a motoring mode to control a motor and in a charging mode to recharge a main battery. The interphase transformer is so constructed that the shunt will be allowed to saturate during the motoring mode, but will be effective to smooth the chopper output current under the lighter current demands of battery charging.

It will now be apparent that what has been provided is a dual chopper configuration of improved construction wherein an interphase transformer is used to combine the signals of the respective legs, said chopper being controlled in a manner allowing the efficient utilization of such interphase transformer.

We claim as our invention:

1. A power converter for use with a source of d.c. power comprising in combination, a chopper circuit having a plurality of chopper legs, each of said legs having a gate controlled thyristor therein, gating means for gating the respective thyristors out of phase with respect to each other, commutating means for commutating the respective thyristors, duty cycle control means operative upon said gating means and said commutating means for establishing the duty cycle of said chopper, interphase transformer means for combining the outputs of the respective chopper legs to produce a single chopper output, and means associated with said duty cycle control means for maintaining the duty cycles of all the legs at identical levels, thereby to produce substantially identical average d.c. outputs at each of the legs for preventing saturation of the interphase transformer means.

2. A power converter for use with a d.c. power source to produce a modulated output voltage comprising in combination, first and second chopper legs, first and second gate controlled thyristors coupled respectively in the first and second chopper legs, first and second gating means for initiating conductive cycles of the respective chopper legs, first and second commutating means for terminating the conductive cycles of the respective chopper legs, duty cycle control means operative upon said gating means and commutating means for varying the time relationship between the operation of the gating means and commutating means thereby to vary the duty cycle of the respective chopper legs, said duty cycle control means including means for operating the respective chopper legs out of phase with respect to each other, interphase transformer means coupled to the output of the respective chopper legs for combining the outputs thereof to form a single chopper output, said duty cycle control means including means for conforming the duty cycle of said second leg to the duty cycle of said first leg thereby to prevent average d.c. current flow between the outputs of the respective legs through the interphase transformer.

3. A power converter for use with a d.c. power source comprising in combination, first and second chopper legs, first and second gate controlled thyristors coupled respectively in the first and second chopper legs, said chopper legs having inputs coupled to the d.c. supply, gating means for initiating a conductive cycle of the respective thyristors and commutating means for terminating such cycle, duty cycle control means for adjusting the period between operation of the gating means and the commutating means, said duty cycle control means including means for conforming the duty cycle of one of said thyristors to that of the other of said thyristors, and an interphase transformer for combining the outputs of the respective chopper legs to produce a single output voltage controlled by the duty cycle of said chopper.

4. The power converter as set forth in claim 3 wherein the interphase transformer comprises a transformer core having first and second windows forming a pair of outer legs and a central leg, first and second windings wound on the respective outer legs, a first end of each winding being joined together to form the output of the interphase transformer, the other ends of the respective windings forming the inputs to the interphase transformer, said central leg forming a magnetic shunt for flux between the respective outer legs thereby to simulate an inductance in series with the output of the interphase transformer.

5. The power converter as set forth in claim 4 wherein the chopper generates high frequency transients and including a load for the chopper, said magnetic shunt serving to limit high frequency transients in the load circuit.

6. The power converter as set forth in claim 4 wherein said chopper generates high frequency transients and including a load circuit for the chopper comprising a first substantially resistive load and a second inductive load having a d.c. impedance which is substantially less than the first load, means for selectively coupling the output of the chopper to the respective loads, the magnetic shunt serving to limit the high frequency transients when said chopper output is coupled to the first load, said magnetic shunt tending to saturate when the chopper output is coupled to the second load, the inductance of said second load serving to limit high frequency transients.

7. A power converter for use with a d.c. power source comprising in combination, a dual chopper having first and second chopper legs with first and second gate controlled thyristors interposed in the respective legs, first and second commutating means associated with the respective legs of the chopper for commutating the chopper thyristors, each of said commutating means including a commutating gate controlled thyristor, interphase transformer means merging the output signals of the respective chopper legs into a single chopper output, and gate signal producing means for driving all of the thyristor gates, said gate signal producing means including means for varying the on-time to off-time ratio for said first chopper leg, and means for causing the on-time to off-time ratio for said second chopper leg to match that of the first chopper leg whereby the duty cycle of the respective legs is varied in the synchronism thereby to avoid average d.c. current between the respective chopper legs through the interphase transformer means.

8. The power converter as set forth in claim 7 wherein the gate signal producing means is adapted to gate said thyristors to cause the respective chopper legs to conduct out of phase with each other, said interphase transformer means serving to combine the out of phase output signals to produce a single controlled chopper output.

9. The power converter as set forth in claim 7 including means for producing a control signal for demanding a level of output from the chopper, and means coupling the control signal to the gate signal producing means for adjusting the duty cycle of the respective chopper legs to produce said demanded output signal.

10. The power converter as set forth in claim 7 wherein the gate signal producing means includes an oscillator for producing a time base signal, and digital means including a counter and a delayed counter responsive to the time base signal for controlling the duty cycle of said chopper.

11. The power converter as set forth in claim 9 wherein the gate signal producing means includes first and second commutating inverter gating drivers, means controlling said drivers to gate the commutating thyristors at a fixed frequency and 180° out of phase with respect to each other, first and second chopper thyristor gating drivers, means responsive to the control signal for actuating said first chopper thyristor gating driver at a point in advance of the gating of the first commutating chopper thyristor determined by said control signal, means for measuring the time interval between the gating of the first chopper thyristor and the gating of the first commutating thyristor, and means responsive to the measuring means for actuating the second chopper thyristor gating driver in advance of the gating of the second commutating thyristor by a period equal to the measured interval.

12. The power converter as set forth in claim 7 wherein an external control signal is provided for establishing the duty cycle of said chopper and wherein said gating circuit comprises oscillator means for producing a fixed frequency output signal, counter means coupled to the oscillator means for counting the oscillator output signal, said counter means having an output forming a square wave of 50% duty cycle, means for alternately gating the commutating thyristors at the respective transitions in the counter output signal thereby to operate said commutating thyristors at a fixed frequency and 180° out of phase with each other, digital to analog converter means coupled to the counter means for producing a ramp signal responsive to the count within the counter means, a phase delay comparator having a first input coupled to the control signal and a second input coupled to the digital to analog converter for comparing the ramp signal to the control signal and causing said phase delay comparator to produce an output signal when said ramp signal and control signal are in a predetermined correspondence, a delayed counter having an input coupled to the oscillator means, said phase delay comparator being coupled to the delayed counter for responding to the output signal of the phase delay comparator to enable said delayed counter to count the output signal of the oscillator, means responsive to the output signal of the phase delay comparator for gating said first chopper thyristor, and means responsive to the output signal of the delayed counter for gating the second chopper thyristor, whereby the duty cycle of the second chopper leg is digitally matched to the duty cycle of said first leg.

13. A power circuit comprising in combination, a storage battery for supplying d.c. power, said storage battery having an internal resistance, a chopper having an input and an output, said input being coupled to the storage battery, means for producing a control signal for controlling the duty cycle of the chopper thereby to control the average voltage at the output thereof, a load coupled to the chopper output for drawing an average current dependent upon the average voltage level at the chopper output, said chopper drawing an RMS current from the battery through the internal resistance thereof for delivering said average current to the load, said chopper comprising a pair of chopper legs operated out of phase with respect to each other and means combining the respective outputs of the out of phase legs thereby to raise said average current with respect to said RMS current.

14. A power converter for use with a source of d.c. power comprising in combination, a chopper circuit having a plurality of chopper legs, switching means within the respective legs, control means for turning the switching means on and off in a controlled phase relationship, duty cycle means operative upon said control means for establishing the duty cycle of said chopper, interphase transformer means for combining the outputs of the respective chopper legs to produce a single chopper output, and means associated with said duty cycle control means for maintaining the duty cycles of all the legs at identical levels, thereby to produce substantially identical average d.c. outputs at each of the legs for preventing saturation of the interphase transformer means.

15. A power converter for use with a d.c. power source comprising in combination, first and second chopper legs, first and second switch means coupled respectively in the first and second chopper legs, said chopper legs having inputs coupled to the d.c. supply, control means for turning the switch means on and off in a controlled phase relationship, duty cycle control means operative on the control means for varying the duty cycle of the chopper, said duty cycle control means including means for conforming the duty cycle of one of said switch means to that of the other of said switch means, and an interphase transformer for combining the outputs of the respective chopper legs to produce a single output voltage controlled by the duty cycle of said chopper.

* * * * *